United States Patent
Pecoraro et al.

(10) Patent No.: US 11,851,520 B2
(45) Date of Patent: Dec. 26, 2023

(54) FLEXIBLE POLYURETHANE FOAM WITH SUSPENDED PARTICLES

(71) Applicant: WOODBRIDGE INOAC TECHNICAL PRODUCTS LLC, Troy, MI (US)

(72) Inventors: Michael C. Pecoraro, New Milford, NJ (US); Raymond Bertram, Raritan, NJ (US)

(73) Assignee: Woodbridge INOAC Technical Products LLC, Troy, MI (US)

( * ) Notice: Subject to any disclaimer, the term of this patent is extended or adjusted under 35 U.S.C. 154(b) by 211 days.

(21) Appl. No.: 16/674,667

(22) Filed: Nov. 5, 2019

(65) Prior Publication Data

US 2020/0148807 A1 May 14, 2020

Related U.S. Application Data

(60) Provisional application No. 62/757,245, filed on Nov. 8, 2018.

(51) Int. Cl.
| | | |
|---|---|---|
| *C08G 18/10* | (2006.01) | |
| *C08G 18/18* | (2006.01) | |
| *C08G 18/24* | (2006.01) | |
| *C08G 18/42* | (2006.01) | |
| *C08G 18/48* | (2006.01) | |
| *C08G 18/76* | (2006.01) | |
| *C08K 3/36* | (2006.01) | |

(52) U.S. Cl.
CPC ............ *C08G 18/10* (2013.01); *C08G 18/18* (2013.01); *C08G 18/246* (2013.01); *C08G 18/42* (2013.01); *C08G 18/4841* (2013.01); *C08G 18/4845* (2013.01); *C08K 3/36* (2013.01); *C08G 2110/0008* (2021.01); *C08G 2110/0041* (2021.01); *C08K 2201/003* (2013.01)

(58) Field of Classification Search
None
See application file for complete search history.

(56) References Cited

U.S. PATENT DOCUMENTS

| | | | | |
|---|---|---|---|---|
| 9,023,907 B2* | 5/2015 | Frei | ..................... | C08G 18/5045 521/155 |
| 2006/0029788 A1* | 2/2006 | Lovell | ................... | B32B 27/065 521/155 |
| 2012/0071576 A1* | 3/2012 | Burdeniuc | ............. | C08J 9/0042 521/128 |
| 2013/0338291 A1* | 12/2013 | Becker-Weimann | ........................ | C08G 18/10 524/430 |
| 2020/0131327 A1* | 4/2020 | Barksby | ............... | C08G 18/283 |

FOREIGN PATENT DOCUMENTS

| | | | | |
|---|---|---|---|---|
| GB | 1093173 A | * | 11/1967 | ............ C08J 9/0066 |
| JP | 2008201946 A | * | 9/2008 | |

OTHER PUBLICATIONS

"Foam Thermoforming", 2018, FoamInsider, pp. 1-4 (Year: 2018).*

* cited by examiner

*Primary Examiner* — Melissa A Rioja
(74) *Attorney, Agent, or Firm* — Reising Ethington P.C.

(57) ABSTRACT

The present disclosure describes a flexible polyurethane foam having suspended within its matrix particles of silicon dioxide, $SiO_2$. The particles of silicon dioxide are interspersed within the polyurethane matrix and protrude from the surface of the foam. These particles form an abrasive surface and the produced foam finds use as a cleaning material. The foam includes the use of a pre-polymer polyol formed by the reaction of triol polyol having a molecular weight of from 700 to 8000 with a polyisocyanate and a tin catalyst. The produced foam is much more durable than commercially available melamine foams and is an effective cleaning foam.

5 Claims, No Drawings

FLEXIBLE POLYURETHANE FOAM WITH SUSPENDED PARTICLES

CROSS-REFERENCE TO RELATED APPLICATIONS

This application claims the benefit of U.S. Provisional Application No. 62/757,245, filed on Nov. 8, 2018.

STATEMENT REGARDING FEDERALLY SPONSORED RESEARCH

NONE.

STATEMENT REGARDING JOINT DEVELOPMENT AGREEMENT

NONE.

REFERENCE TO SEQUENCING LISTING, TABLE OR COMPUTER PROGRAM LISTING

NONE.

STATEMENT REGARDING PRIOR DISCLOSURES BY THE INVENTOR OR A JOINT INVENTOR UNDER 33 C.F.R 1.77(B)(6)

NONE.

FIELD OF THE DISCLOSURE

This present disclosure relates generally to flexible polyurethane foam, and more particularly to a flexible polyurethane foam having abrasive particles suspended in it.

BACKGROUND OF THE DISCLOSURE

This section provides background information which is not necessarily prior art to the inventive concepts associated with the present disclosure.

Polyurethane foams are well known in the art and typically are formed from polymers composed of a variety of organic units joined by carbamate, meaning urethane, linkages. These are generally thermosetting polymers; however, they can also be designed as thermoplastic polymers. The foams formed from the polyurethanes can range from rigid foam to very flexible foams. The underlying polymers can include polyether and polyester polymers. The polyurethane formation reaction comprises reaction between at least one polyisocyanate and a polyol polymer, meaning it has terminal —OH groups. The reaction is often facilitated by use of catalysts or ultraviolet (UV) light. The more crosslinking between the polymers in the foam the more rigid the foam and conversely a foam with a lower level of crosslinking is more flexible. The typical catalysts used include tertiary amines and/or metallic catalysts, alone or in combinations. When the reaction is carried out in the presence of water the final foam also contains urea linkages formed by the water and polyisocyanate reacting with the generation of carbon dioxide gas, which in turn acts as a blowing agent in the foam, this reaction is promoted by tertiary amine catalysts. Polyurethane foams can be used to form a wide variety of foamed objects.

In the area of abrasive cleaning foams one well known abrasive foam is the melamine foam material, marketed by Mr. Clean® as Magic Eraser. This foam is formed from a formaldehyde-melamine-bisulfate copolymer material. The foam that is formed from this copolymer forms very hard strands of foam within the matrix, which forms its abrasive characteristics. One complaint with the melamine foam material is that it does not have a very long usable life, like an eraser the material is used up as the consumer uses the foam to clean an object. In addition, especially when used on rough surfaces, the foam quickly disintegrates and becomes unusable. Thus, it is not a very durable material.

It is desirable to provide an abrasive foam material that could be used to clean a variety of surfaces, especially rough surfaces, with extended durability and improved cleaning action. In addition, it is desirable to provide such a foam material that is cost-effective to produce and use in an industrial setting.

SUMMARY OF THE DISCLOSURE

This section provides a general summary of the present disclosure and is not intended to be interpreted as a comprehensive disclosure of its full scope or all features, aspects and objectives.

The present disclosure describes a flexible polyurethane foam having suspended within its matrix particles of silicon dioxide, $SiO_2$. The particles of silicon dioxide are interspersed within the polyurethane matrix and protrude from the surface of the foam. These particles form an abrasive surface and the produced foam finds use as a cleaning material. The foam includes the use of an OH-terminated pre-polymer polyol with functionalities of from 2.5 to 4, formed by the reaction of a diol or triol polymer polyol having a molecular weight of from 700 to 8000 with a polyisocyanate and a tin catalyst.

The foam is a highly improved cleaning foam with over three fold higher tear strength and elongation at break compared to a commercial melamine foam. These and other features and advantages of this disclosure will become more apparent to those skilled in the art from the detailed description herein. The drawings that accompany the detailed description are described below.

BRIEF DESCRIPTION OF THE DRAWINGS

NONE.

DETAILED DESCRIPTION OF THE DISCLOSURE

In the following description, details are set forth to provide an understanding of the present disclosure.

For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or feature is referred to as being "on," "engaged to," "connected to," "coupled to" "operably connected to" or "in operable communication with" another element or feature, it may be directly on, engaged, connected or coupled to the other element or layer, or intervening elements or features may be present. In contrast, when an element is referred to as being "directly on," "directly engaged to," "directly connected to," or "directly coupled to" another element or feature, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The present disclosure describes a flexible polyurethane foam having suspended within its matrix particles of silicon dioxide, $SiO_2$. The particles of silicon dioxide are interspersed within the polyurethane matrix and protrude from the surface of the foam. These particles form an abrasive surface that finds use as a cleaning material. The foam has very high durability, especially as compared to a melamine foam, and thus has a longer cleaning lifecycle. The foam can be thermoformed, just as melamine typically is, leading to an even denser material which effectively enhances the durability of the foam.

The foams according to the present disclosure make use of a specific class of pre-polymer polyol components that lead to the desirable physical characteristics of the foam. The pre-polymer polyols finding special use in the present disclosure are the reaction products of a polyisocyanate with a polyether or polyester polyol having a preferred functionality of at least 2, preferably 3 and a molecular weight range of from 700 to 8,000 in the presence of an organotin catalyst. The preferred polyether or polyester polyols are trifunctional meaning they have three reactive hydroxy (OH) groups. The reaction product, the pre-polymer polyol, preferably has a hydroxyl number of 5 to 50, it preferably has a functionality of 2.5 to 4 and a molecular weight of from 3,000 to 10,000. The pre-polymer polyol is formed by first combining the polyether or polyester polyol with the organotin catalyst. To this mixture the polyisocyanate is added and the combination is mixed for 3 to 15 hours to complete the reaction. The temperature is not controlled and since this is an exothermic reaction the final temperature of the mixture may reach as high as 57° C. (135° F.), although the optimal peak temperature is 45 to 47° C. (about 114 to 116° F.). In one example of formation of a pre-polymer polyol, shown below as example 1, an amount of 96.53% by weight of the polyether polyol Carpol® GP-3008 was combined with 0.03% by weight of stannous octoate and 3.44% by weight of 80/20 TDI to form the pre-polymer polyol, all amounts as a percentage of the total reaction mixture weight. Preferably, the pre-polymer polyol is synthesized using a ratio of OH equivalents: NCO equivalents ranging from 1.1:1 to 10:1. The equations below define OH equivalents and NCO equivalents. From 0 to 0.2% by weight is the optimal range for an organotin catalyst to be used in addition to the OH and NCO components.

$$equiv_{OH} = \left(\frac{1000 \times MW_{K+OH^-}}{m_{polyol} \times OH\#}\right) \quad 1.)$$

$$equiv_{NCO} = \left(\frac{100 \times MW_{NCO}}{m_{iso} \times NCO\ \%}\right) \quad 2.)$$

The preferred polymer polyol used to form the pre-polymer polyol can be selected from polyether or polyester polyols that are di and preferably tri-functional, having a molecular weight of from 700 to 8,000. One example is Carpol® GP-3008, which is a 3,000 molecular weight triol polyether formed from a glycerine initiator and propylene oxide with approximately 8% ethylene oxide located internally in the polymer polyol. Other glycerine-initiated polyols containing propylene oxide and/or ethylene oxide are equally suitable for use in the present invention. The polyol GP-3008 is used in the examples because it is the most commercially accessible polyol. Graft polyols containing finely dispersed solid particles, are equally suitable for the pre-polymer synthesis, but limit the amount of solid $SiO_2$ particles that can be used in the foam.

The polyisocyanates suitable to form the pre-polymer polyol are any of the well-known polyisocyanates including, by way of example and not limitation: 80/20 and 60/40 toluene diisocyanate (TDI), methylene diphenyl diisocyanate (MDI), hydrogenated MDI (H12MDI), hexamethylene diisocyanate (HDI), and isophorone diisocyanate (IPDI). The most preferred are 80/20 TDI and 60/40 TDI.

The formation of the pre-polymer polyol also utilizes an organotin catalyst. These are known polyurethane reaction catalysts and include by way of example and not limitation: stannous octoate, dibutyltin dilaurate and dibutyltin diacetate.

The pre-polymer polyol is then combined with other components to form the final abrasive foam sponge material. The preferred non-isocyanate components of the final abrasive foam sponge material are provided below in Table 1 in terms of pph (parts per 100 parts of total polyol in the reaction mixture on a mass basis). These components are combined with a polyisocyanate, examples of suitable polyisocyanates are as described herein, preferably at an operating index of from 85 to 120, more preferably at an operating index of 90.

TABLE 1

| Component | Preferred pph | Most preferred pph |
|---|---|---|
| Pre-polymer polyol | 5-100 | 70 |
| Second polymer polyol | 0-95 | 30 |
| Chain extender/cross-linker | 0.2-8.0 | 4.0 |
| Water | 1.8-6.5 | 5.2 |
| Surfactant | 1.0-5.0 | 3.0 |
| Amine catalyst | 0-0.5 | 0.3 |
| Gelling catalyst | 0-1.5 | 0.8 |
| Blocking agent | 0.1-10.0 | 3.0 |
| Anti-scorching agent | 2.0 | 2.0 |
| $SiO_2$ | 1-150 | 100 |

The pre-polymer polyol is as described herein above and it is preferably present at 5 to 100 pph. The second polymer polyol, preferably a polyether polyol, can be selected from any of a wide variety of polyols, preferably a triol polyol, and most preferably a polyol having a high solids level of about 50%, preferably about 45 to 50% by weight based on total polyol weight. For example, a 49% solids polyol such as Arcol® HS-200 is especially preferred. A higher solids content graft polyol is preferred because this maximizes the amount of pre-polymer that can be used to achieve a given hardness. As known to one of skill in the art, a graft polyol refers to a polymer that has finely dispersed styrene-acrylonitrile, acrylonitrile, or polyurea polymer solids chemically grafted to the polymer backbone, typically a polyether polymer backbone.

A preferred cross-linker/chain extender is glycerol since it is tri-functional. Other suitable crosslinker and chain extenders can be used as known in the art and include by way of example and not limitation: ethylene glycol; diethylene glycol; triethylene glycol; tetraethylene glycol; propylene glycol; dipropylene glycol; tripropylene glycol; 1,3 propanediol; 1,3 butanediol; 1,4 butanediol; neopentyl glycol; 1,6 hexanediol; cyclohexane dimethanol and hydroquinone bis (2-hydroxyethyl) ether (HQEE); trimethylolpropane; and 1,2,6 hexanetriol.

The surfactant(s) can include any suitable known polyurethane foam surfactants especially silicone surfactants such as Niax® L-620.

The amine catalysts, preferably tertiary amines, are well known to those of skill in the art and include the JeffCAT® catalyst ZF-20, which is Bis-(2-dimethylaminoethyl) ether, and which can be diluted in dipropylene glycol as is Jeff-CAT® ZF-24. Other suitable amine catalysts include: Bis [2-(diemethylamino)ethyl]ether; N,N-dimethylaminopropylamine (DMAPA); N,N-dimethylcycloheylamine; N,N,N',N',N"-pentamethyldiethhylenetriamine; 2-(2-(2-dimethyl amino ethoxy)-ethylmethylamino)-amino; N-cyclohexyldiethanolamine;

diethanolamine; N,N-diethylethanolamine; trimethylamine; N,N,N'N'-tetramethylethylenediamine; N,N,N',N' tetramethyl-1,3-butanediamine; and 2,2'-dimorpholinodiethylether. The gelling catalysts can include examples such as Kosmos® 10P. The anti-scorching agents for foams are well known in the art and can include Ingrastab® PUR 68. Preferably a blocking agent such as oleic acid is used to allow for excess gelling and the resultant greater extent of curing to occur. This further improves the tensile strength of the foam.

The $SiO_2$ can be sourced from a multipurpose sand stock and preferably has a diameter range of from 20 microns to 1 millimeter.

The foam is formed by combining all the solid components with polyol. The polyol/solids slurry is then pumped into a mix chamber where the slurry is introduced to the polyisocyanate, water, catalysts, surfactants and additional additives. This mixture is mixed under high pressure. The catalysts, surfactants and additional additives are most preferably added just before the mixing chamber, at which point the polyisocyanate is injected directly into the mixing chamber at high pressures (300-1100 psi). The reaction mixture is then expelled from a nozzle directly below the mixing chamber onto a moving conveyor where the foam is allowed to form.

The $SiO_2$ is uniformly distributed throughout the foam and is visible on the outer surface of the foam as protrusions. The virgin foam preferably has a density of from 1 to 4 pounds per cubic foot. The virgin foam can then be thermoformed to create a denser, more durable product. For example the virgin foam can be felted, where it is placed between two heated platens at a temperature of from 300 to 450° F. for 1 to 10 minutes. The compression ratio can range from 2:1 to 10:1 and it produces a foam having a density of from 1 to 10 pounds per cubic foot.

The foams produced according to the present disclosure have far improved properties compared to melamine foam products. A foam produced according to the present disclosure was compared to a commercial melamine product for tear strength and elongation at break, the results are shown in Table 2 below. One sees the foam according to the present disclosure had a 3.756 fold higher tear strength and elongation at break compared to the melamine.

TABLE 2

| Foam sample | Tear strength ppi | Elongation at break % |
| --- | --- | --- |
| melamine | 0.4 | 20 |
| Present foam | 1.5 | 75 |

To use the foam according to the present disclosure one wets the foam and then rubs the desired surface to clean it. The foams are significantly more durable and effective compared to commercial melamine foams, especially when wet.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

We claim:

1. A method of making a flexible polyurethane abrasive foam product comprising the steps of:
   a) providing a total polyol composition consisting of: a pre-polymer polyol and, optionally, a second polyol that is a polyether polyol, the pre-polymer polyol having a functionality of 2.5 to 4, a molecular weight of 3,000 to 10,000 and a hydroxyl number of 5 to 50, wherein said pre-polymer polyol is prepared from a reaction mixture comprising a first polymer polyester or polyether polyol having a —OH functionality of at least 2 and a molecular weight of from 700 to 8,000, a polyisocyanate and an organotin catalyst;
b) providing silicon dioxide particles having a diameter of from 20 microns to 1 millimeter;
c) providing at least one of a triamine catalyst or a gelling catalyst;
d) providing a polyisocyanate;
e) reacting the components provided in steps a) and d) together, wherein the total polyol composition is the only source of polyols in the method, in the presence of the components provided in steps b) and c) at an operating index of 85 to 120 under atmospheric pressure and without added heat to produce a flexible polyurethane abrasive foam product having the silicon dioxide particles uniformly distributed throughout the abrasive foam and protruding from an outer surface of said abrasive foam to form an abrasive surface; and
f) thermoforming the abrasive foam at a maintained temperature ranging from 300° F. to 450° F. for 1 to 10 minutes under a compression ratio of from 2:1 to 10:1 by placing the foam from step e) between two heated platens at a temperature of from 300° F. to 450° F. for 1 to 10 minutes under a compression ratio of from 2:1 to 10:1 to produce an abrasive foam having a density of from 1 to 10 pounds per cubic foot.

2. The method of claim 1 where in step a) the second polyol is present.

3. The method of claim 1, wherein the silicon dioxide particles are present in an amount of from 1 to 150 pph, with pph meaning parts per hundred parts of the total amount of polyol in the total polyol composition on a mass basis.

4. The method of claim 3, wherein the reaction of step e) further occurs in the presence of one of water in an amount of from 1.8 to 6.5 pph, a crosslinker or chain extender in an amount of from 0.2 to 8.0 pph, a surfactant in an amount of from 1.0 to 5.0 pph, a blocking agent in an amount of from 0.1 to 10.0 pph, and an anti-scorching agent in an amount of 2.0 pph.

5. The method of claim 2, where in step a) the second polyol is present in an amount of up to 95 pph, with pph meaning parts per hundred parts of the total amount of polyol in the total polyol composition on a mass basis.

* * * * *